United States Patent [19]

Cote

[11] Patent Number: 5,765,416
[45] Date of Patent: Jun. 16, 1998

[54] DEVICE FOR HOLDING DOWN BRAKE PEDAL OF A MOTOR VEHICLE

[76] Inventor: Daniel Cote, 2280 SW. 43rd Ter., Fort Lauderdale, Fla. 33317

[21] Appl. No.: 785,785

[22] Filed: Jan. 21, 1997

[51] Int. Cl.⁶ .................................................. B60R 25/00
[52] U.S. Cl. ............................ 70/238; 70/202; 292/339
[58] Field of Search ..................... 70/94, 209, 198–205, 70/237, 238; 292/338, 339

[56] References Cited

U.S. PATENT DOCUMENTS

| | | | |
|---|---|---|---|
| 3,245,239 | 4/1966 | Zaidener | 70/202 |
| 4,432,432 | 2/1984 | Martin | 70/238 X |
| 4,607,253 | 8/1986 | Wooten et al. | 292/339 X |
| 4,792,168 | 12/1988 | Kardosh | 292/339 X |
| 4,971,374 | 11/1990 | Lovell et al. | 292/339 |
| 5,131,701 | 7/1992 | Stepniewski | 292/339 |
| 5,267,458 | 12/1993 | Heh | 70/238 |
| 5,286,075 | 2/1994 | Monzingo | 292/339 |
| 5,345,796 | 9/1994 | Chieh et al. | 70/202 |
| 5,437,486 | 8/1995 | Hoffman | 292/339 |
| 5,544,386 | 8/1996 | Cobb | 292/339 X |

FOREIGN PATENT DOCUMENTS

| | | | |
|---|---|---|---|
| 1019016 | 10/1977 | Canada | 292/339 |
| 2102495 | 2/1983 | United Kingdom | 292/339 |

*Primary Examiner*—Suzanne Dino Barrett
*Attorney, Agent, or Firm*—Joseph Zallen

[57] ABSTRACT

A device for locking a brake pedal in depressed condition, comprising a first tube, and a second tube concentric and slidable in said first tube; said first tube having brake pedal engaging means; said second tube having steering wheel engaging means; said device having spring actuated button means for extending and locking said tubes together in selected positions.

1 Claim, 7 Drawing Sheets

DEVICE FOR HOLDING DOWN BRAKE PEDAL OF A MOTOR VEHICLE

BACKGROUND OF INVENTION

This invention relates generally to an adjustable device for holding down the brake pedal of a vehicle.

Brake pedal depressor tools have been described in the prior art. Examples of such prior art are the following United States patents: U.S. Pat. No. 1,558,854 N. Falconer, Oct. 27, 1925, U.S. Pat. No. 1,707,113 E. F. Christ, Mar. 26, 1929, U.S. Pat. No. 2,138,911, M. H. Evans, et al., Dec. 06, 1938, U.S. Pat. No. 2,662,728 R. A. Hanes, et al., Dec. 15, 1953, U.S. Pat. No. 3,226,997 P. V. Malloy, Jan. 04, 1966, U.S. Pat. No. 3,722,266, J. C. Dunham, Mar. 27, 1973, U.S. Pat. No. 3,910,135, A. C. Phillips, Oct. 07, 1975, U.S. Pat. No. 5,299,668, Youngers, et al., Apr. 05, 1994, U.S. Pat. No. 5,345,796, Chieh, et al., Sep. 13, 1994, U.S. Pat. No. 5,417,127, Bueti, et al., May 23, 1995, and Des. U.S. Pat. No. 319,566, W. E. Hillock, Jr., Sep. 03, 1991.

Each example of the prior art has one or more disadvantages, such as either requiring threading or a set screw or a pneumatic cylinder or is cumbersome and complex.

One object of the present invention is to provide a novel, compact, lightweight tool which can be readily extended between the steering wheel of a vehicle and the brake pedal and keep the brake pedal depressed.

A further object of this invention is to provide such a tool which can be readily extended to the desired length and then retracted Other objects and advantages of this invention will be apparent from the description and claims which follow taken together with the appended drawings.

BRIEF SUMMARY OF INVENTION

The invention comprises generally a pair of telescoping, elongated tubes which include spring-loaded means for locking the tubes together at selected locations.

The primary purpose of the invention is to hold a brake pedal down to check the operability of various features related to the brake, such as the brake lights. This makes it possible for a single automobile mechanic to check whether all the brake lights are turning on properly without having to call in a colleague to hold the brake pedal down.

By changing the ends of the device, it can be used in many other ways, as for example to hold open the hood or trunk of an automobile or hold open the door of a car at an angle for repair. It can also be used for applying a lock on all four wheels making it impossible to move. Also, when used to depress the brakes of a vehicle, it can be used to keep the vehicle from moving. Such a situation arises when loading a boat onto a trailer which is in the water. The rear vehicle wheels may be slippery, but the front wheels would be dry. In this way, a single person can brake the front wheels without needing another person.

BRIEF DESCRIPTION OF DRAWINGS

FIG. 1a is a partial enlarged cutaway of a portion of FIG. 1.

FIG. 1b is an enlarged view of the spring-loaded button 24 of FIG. 1.

DETAILED DESCRIPTION OF INVENTION

Example 1

Figure 1:
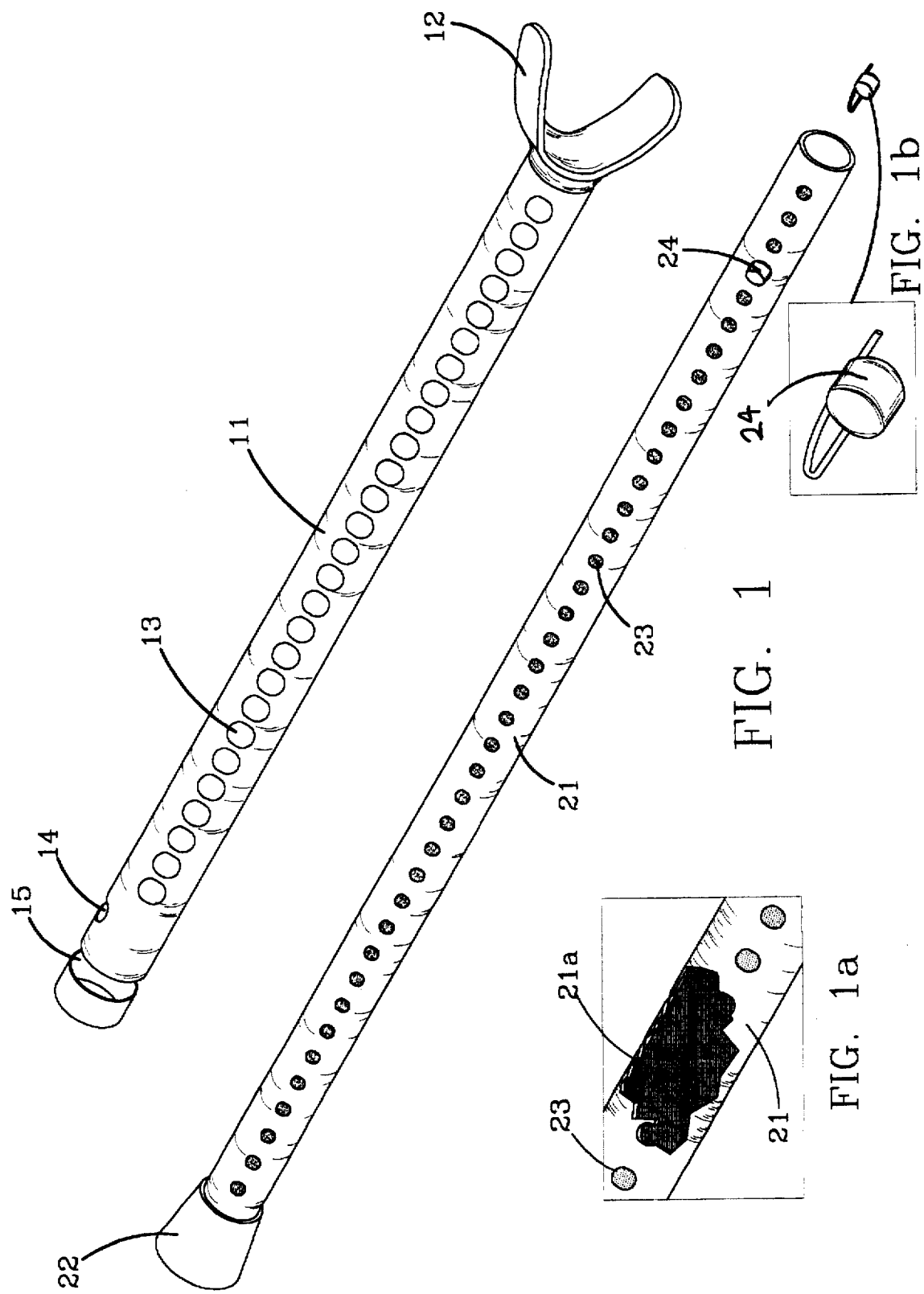
FIG. 1 is an exploded view of one embodiment of the invention.
Figure 2:
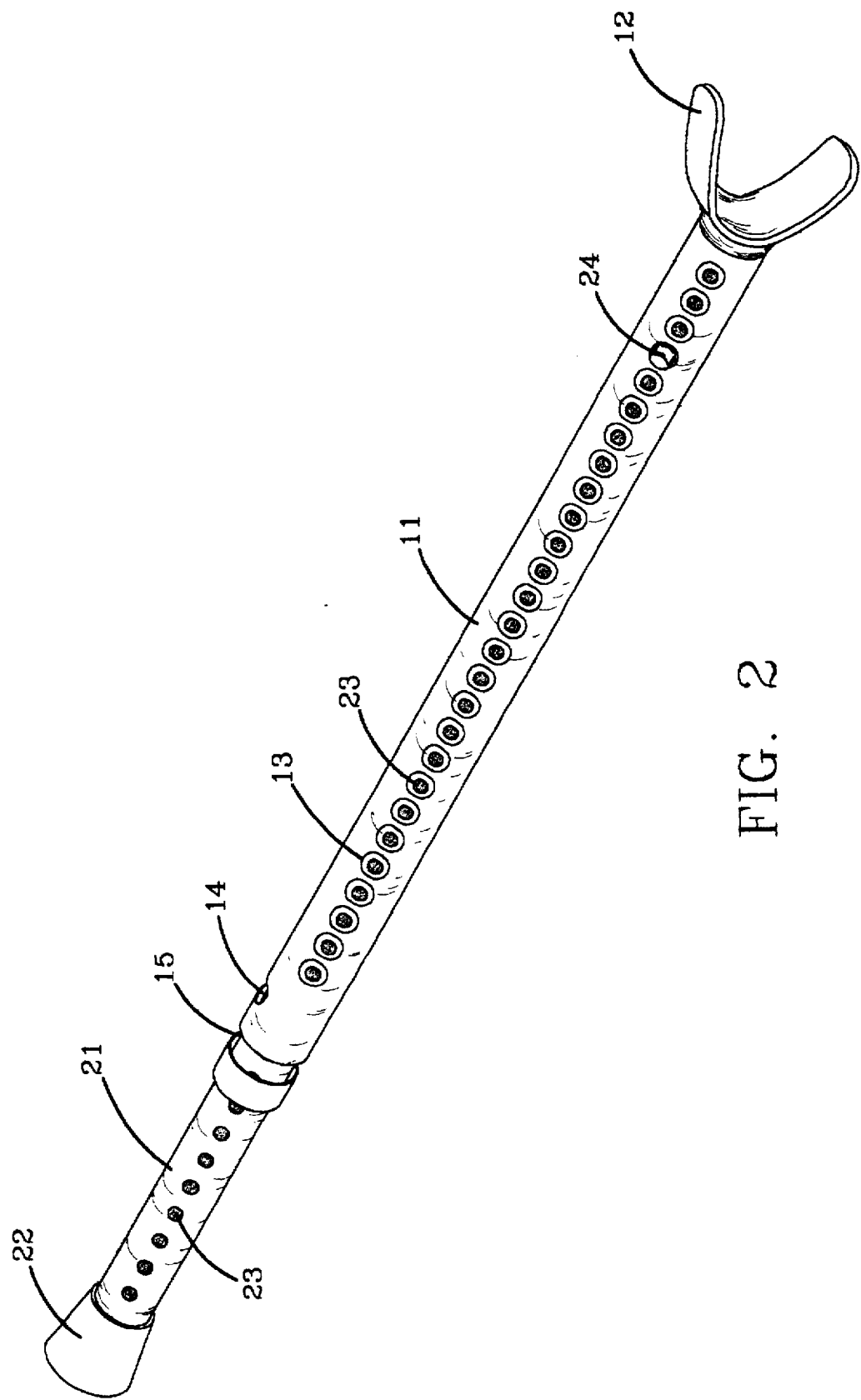
FIG. 2 is an assembly view of the embodiment of FIG. 1 in retracted position.
Figure 3:
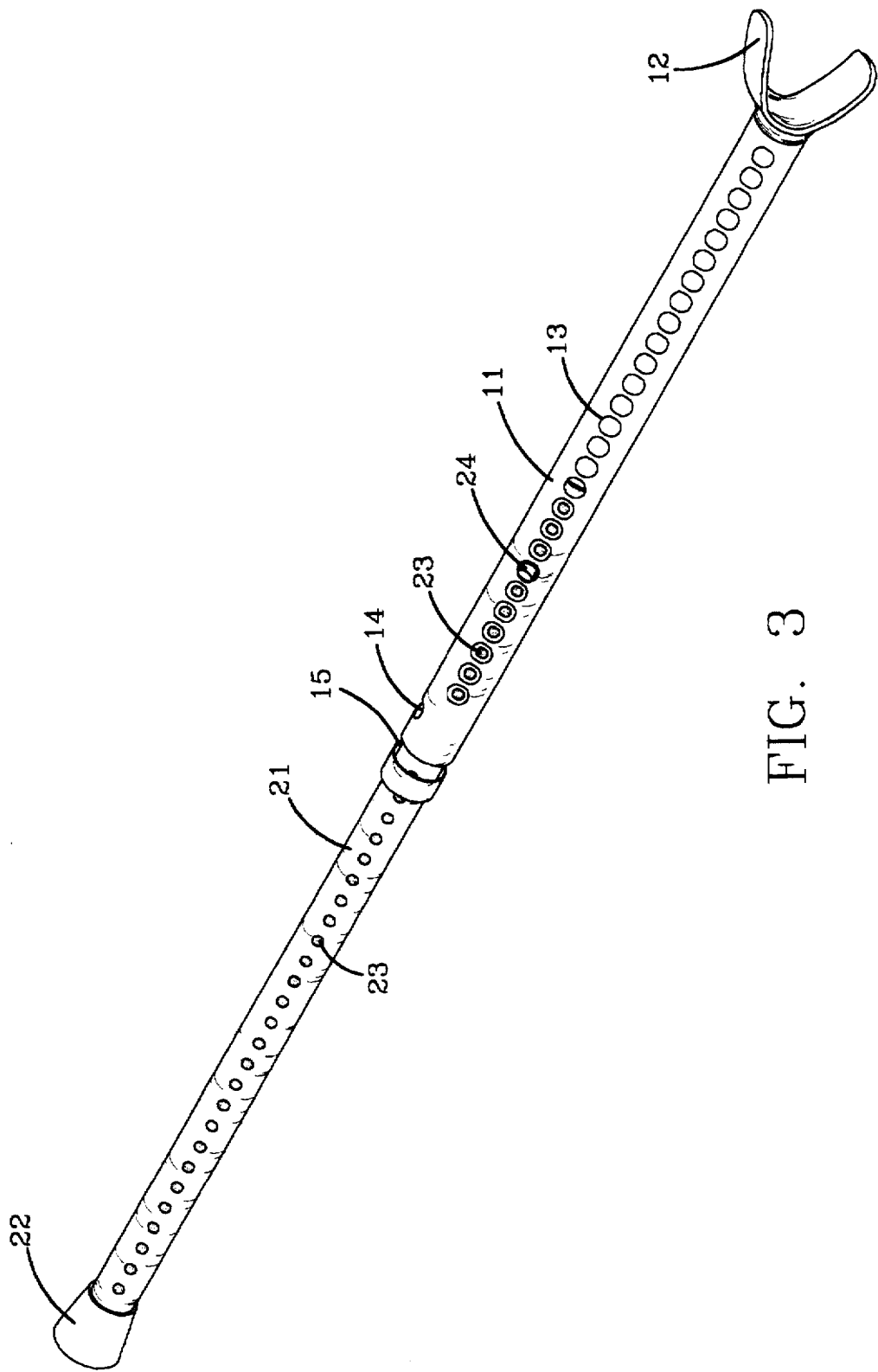
FIG. 3 is an assembly view of the embodiment of FIG. 1 in extended position.
Figure 4:
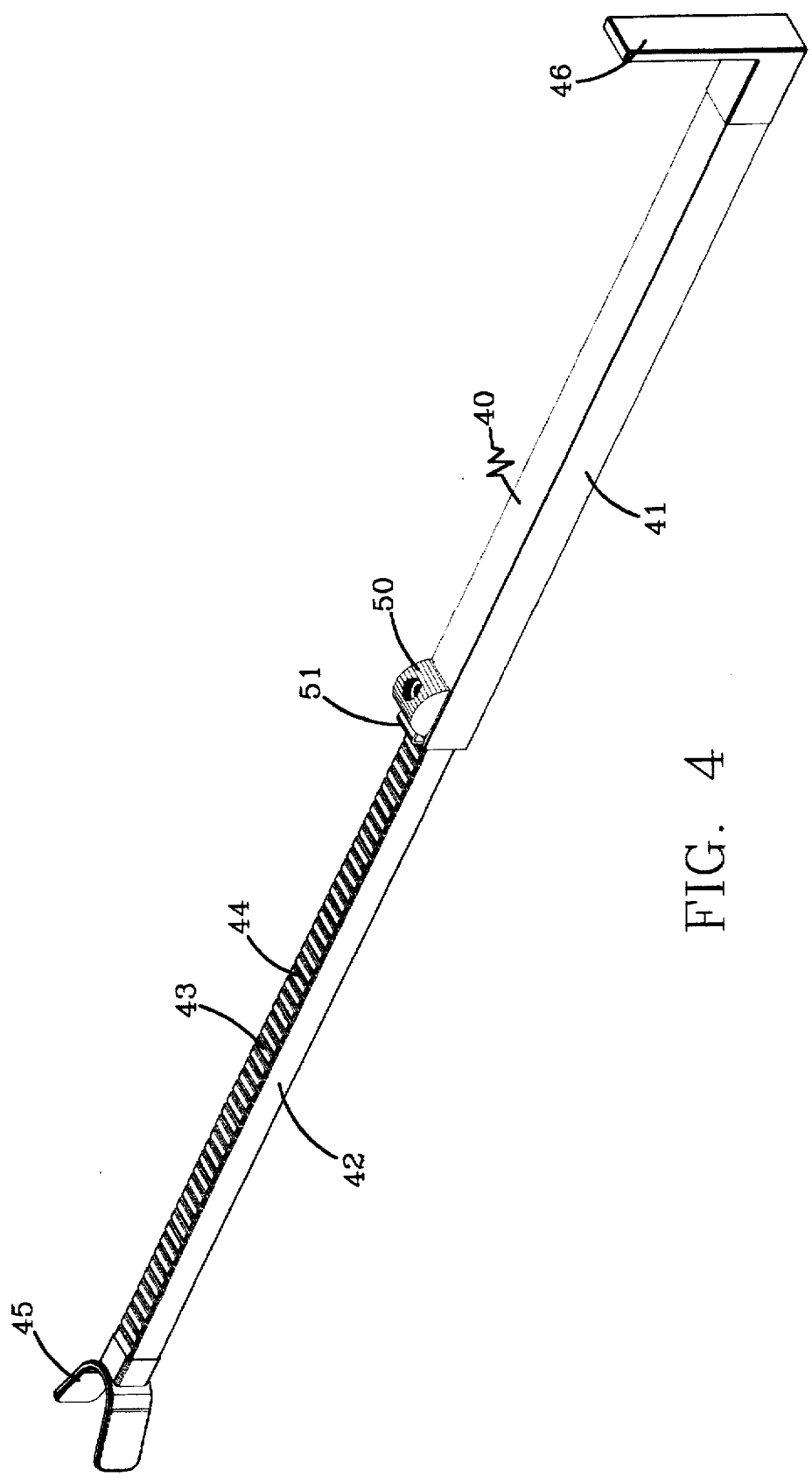
FIG. 4 is an assembly view of a second embodiment of the invention in extended position.
Figure 5:
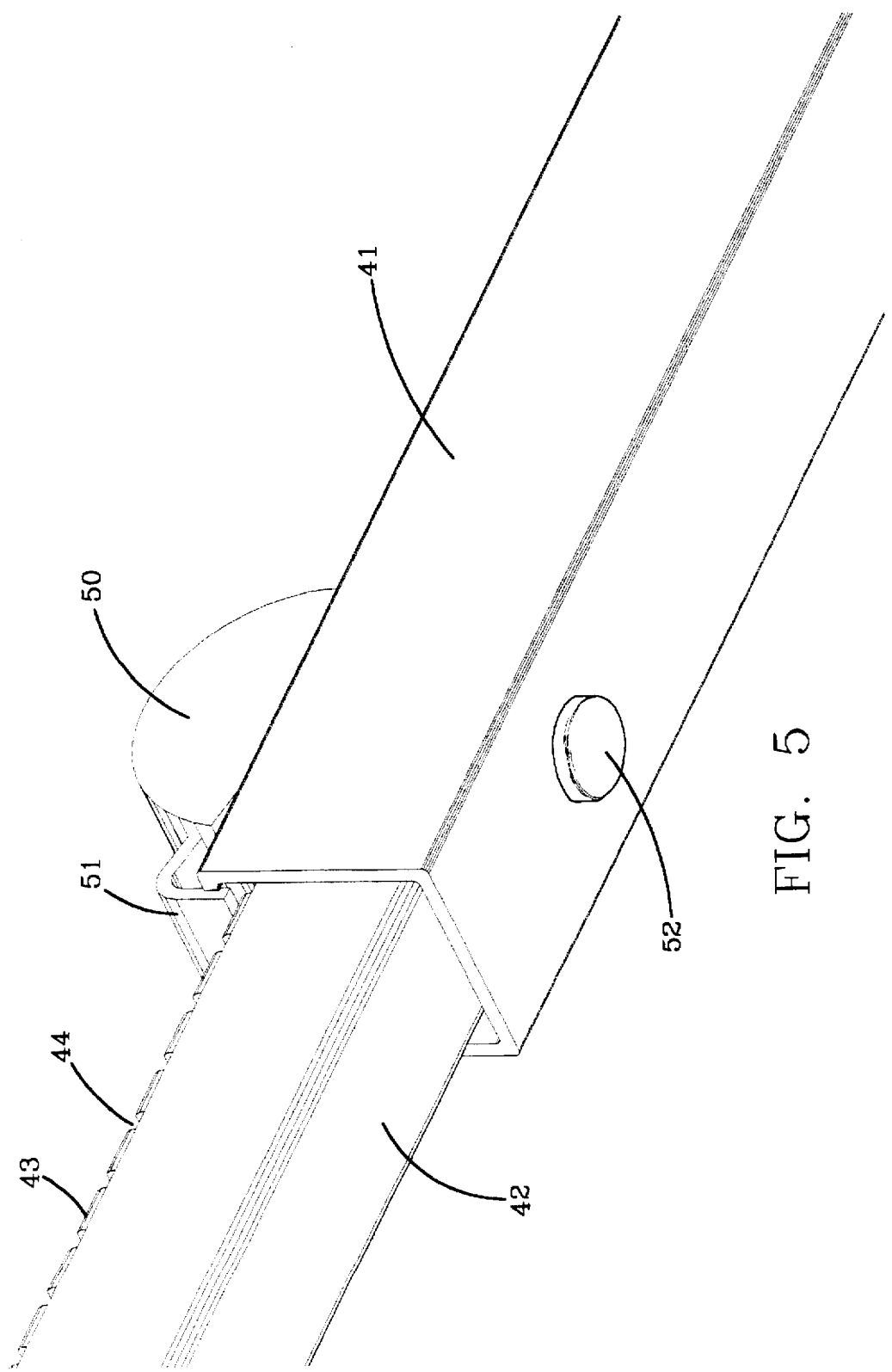
FIG. 5 is a partial view from the other side of the embodiment of FIG. 4.
Figure 6:
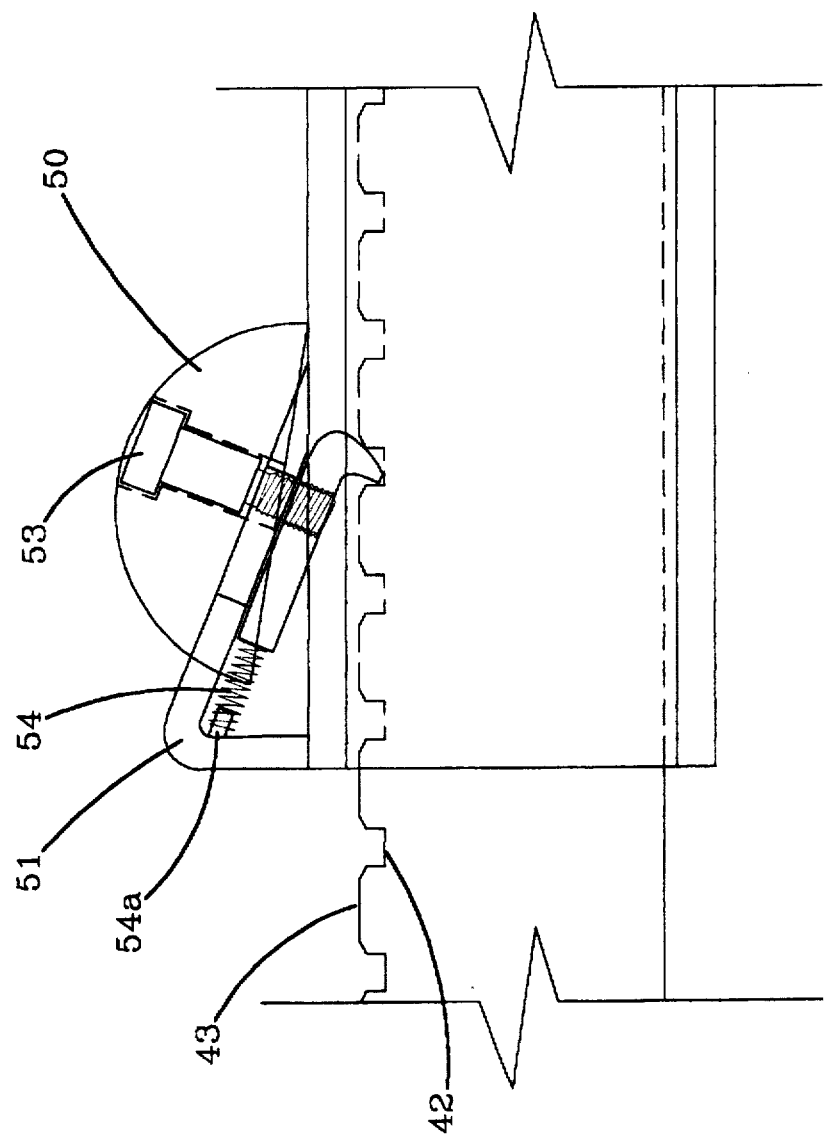
FIG. 6 is a partial longitudinal section of the second embodiment in locked position.
Figure 7:
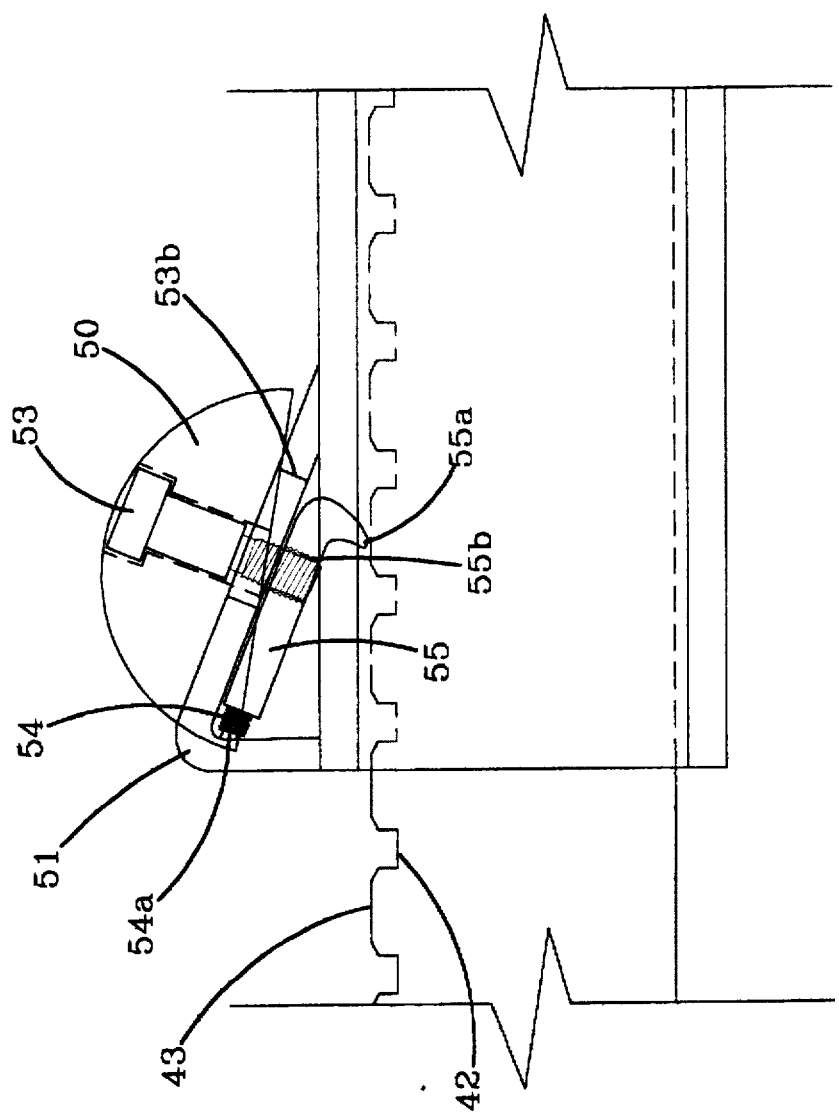
FIG. 7 is a partial longitudinal section of the second embodiment with the button pushed up so the parts can slide.

Referring now to FIGS. 1–3 of the drawings, the example illustrated therein comprises an outer tube 11 and an inner tube 21 slidable in the outer tube. The outer tube has a pair of recesses 14 and 15 and an array of orifices 13. At one end of the tube 11 is a steering wheel clamp 12 fixedly connected to tube 11. The inner tube 21 has an array of smaller orifices 23 which when inserted in tube 11 can register with the orifices 13. At one end of the tube 21 is a brake pedal pad 22. Near the other end of the inner tube 21 is a spring-loaded button 24. In the interior of tube 21 is a concentric colored tube 21a. The colored tube 21 is visible through the orifices when the two arrays 13 and 23 are aligned.

When the device is assembled and is in retracted condition as shown in FIG. 2, the spring-loaded button 24 protrudes through a registering orifice 13 so that the two tubes 11 and 21 are locked together.

When it is desired to extend the device, button 24 is pressed down and the tubes twisted so that the device can be extended to the desired length. Then the steering wheel clamp 12 is applied to the steering wheel and the brake pedal pad 22 depresses the brake pedal. Then rotation of the tube causes the button to extend into one of the recesses 14 or 15 which results in the extended device being locked firmly.

To retract the device so as to remove it from its position between the steering wheel and the brake pedal, the button is depressed and the tube is turned which permits release and movement of the tubes with respect to one another.

Example 2

Referring now to FIGS. 4–7 of the drawings the example illustrated therein comprises an elongated outer tube 41 and an elongated inner tube 42 slidable in the outer tube. The end of tube 41 has brake pedal pad 46. The end of member 42 has a steering wheel engaging clamp 45.

Both the tube 41 and member 42 have a rectangular cross-section. The upper surface of member 42 has an array of teeth 44 alternating with grooves 43 to form a rack. On the upper surface of the inner end of the tube 41 is a button 50 slidable up ramp 51. Button 50 includes a member 53 attached to a hook 55 having a curved tooth/groove engaging end 55a. A rod 54a extends from the ramp 51. Spring 54 has one end mounted on rod 54a and the other end attached to the inner end of hook 55.

When the spring 54 is extended, the hook end 55a rests in a groove 43 in the rack, and thus keeps the tube 41 and member 42 locked together. If the button 50 is slid up the ramp 51, the hook end 55a is released from the groove, until the pressure on the button is withdrawn, whereupon the spring 54 pushes the hook end 55a into an adjacent groove, thus locking the tube and sliding member together. This permits the device to be easily extended and retracted.

Button 52 actuated by a spring clip similar to that illustrated in FIG. 1b acts as an end stop to prevent the tube and member from pulling apart.

I claim:

1. A device for locking a brake pedal in depressed condition, comprising a first tube (41) of rectangular cross-section, a second tube (42) of rectangular cross-section and concentric with and slidable in said first tube; said first tube having brake pedal engaging means (46), said second tube having steering wheel engaging means (45), the outer surface of said first tube (41) having a ramp (51) and a sliding button (50) movable on said ramp (51); said button (50) including a member (53) attached to a hook (55) having an engaging end (55a); a spring (54) being mounted on the inner side of said ramp (51) and engageable with the other end of said hook (55); said second tube (42) having on an upper surface an array of teeth (44) and grooves (43) forming a rack; said groove-engaging end (55a) being engageable with a groove (43) in the rack when said spring (54) is extended; said groove-engaging end (55a) being dis-engageable by the moving of said button (50) on the ramp (51).

* * * * *